United States Patent
McCance

(10) Patent No.: US 7,077,315 B2
(45) Date of Patent: Jul. 18, 2006

(54) CARD READER CLEANING PLOW APPARATUS AND METHOD

(76) Inventor: Willoughby C. McCance, 16 Chapman La., Gales Ferry, CT (US) 06335

( * ) Notice: Subject to any disclaimer, the term of this patent is extended or adjusted under 35 U.S.C. 154(b) by 0 days.

(21) Appl. No.: 11/115,328

(22) Filed: Apr. 27, 2005

(65) Prior Publication Data

US 2005/0242195 A1 Nov. 3, 2005

Related U.S. Application Data

(60) Provisional application No. 60/565,673, filed on Apr. 28, 2004.

(51) Int. Cl.
*G06K 7/08* (2006.01)
(52) U.S. Cl. .................................... 235/449
(58) Field of Classification Search ................ 235/475, 235/487, 441, 449
See application file for complete search history.

(56) References Cited

U.S. PATENT DOCUMENTS 4,479,136 A * 10/1984 Lewis et al. .................. 347/33
5,227,226 A 7/1993 Rzasa
6,210,490 B1 * 4/2001 Michael et al. ................. 134/6
6,353,233 B1 * 3/2002 Kikuchi et al. ............. 250/556
2004/0016446 A1 * 1/2004 Krancevic ...................... 134/8
2004/0035444 A1 * 2/2004 Muhr-Sweeney .............. 134/6

FOREIGN PATENT DOCUMENTS

JP 06176207 A * 6/1994
JP 09007129 A * 1/1997

* cited by examiner

*Primary Examiner*—Thien M. Le
*Assistant Examiner*—April Taylor
(74) *Attorney, Agent, or Firm*—McGuireWoods LLP

(57) ABSTRACT

A cleaning card system and method for cleaning contaminants accumulated in a card reader and pushing dust or dirt out the back of the card reader is disclosed. The card reader cleaning plow of the invention includes a semi-rigid material having the same or similar width and thickness of a data bearing card that is normally read by the card reader, but being longer and having a notch, or notches, cut in the leading edge of the card reader cleaning plow that allows the insertion of the card reader cleaning plow beyond the limiter post, or posts built into the card reader. The card reader cleaning plow may be inserted into the card reader and cleans the reader heads, any rollers or guides and the feed path, and harmlessly pushes the dust and particulates buildup through the device.

17 Claims, 9 Drawing Sheets

CARD READER CLEANING PLOW APPARATUS AND METHOD

CROSS REFERENCE TO RELATED APPLICATION

This application claims priority to provisional patent application 60/565,673 filed on Apr. 28, 2004, the disclosure of which is incorporated by reference herein, in its entirety.

FIELD OF THE INVENTION

1. Field of the Invention

The invention generally relates to an apparatus and method for cleaning card readers and, more specifically, to an apparatus and method of cleaning card readers without dismantling the card readers.

2. Background of the Invention

In today's world, many transactions are carried out using data-carrying cards. For example, a transaction card (e.g., magnetic strip encoded card, bar code encode card, proximity cards, Wiegand cards, smart cards, or the like) which may carry data of one type or another is often used in various application platforms such as credit/debit card readers, ATM/POS (Automated Teller Machine/Point of Sale) terminals, facsimile and copy machines, slot and other gaming machines, vending machines, time/badge readers, telephone card readers, currency counters, hotel door locks, security gates and security access, just to name a few examples. For some of these devices, the transactional card is typically moved (or "swiped") through a card reader. For other devices, the transactional card is inserted into the card reader through a slot or opening.

For those card readers for which the data-carrying transaction card is inserted into the card reader, rather than swiped, the repetitive insertion of these cards often results in a collection of dust and other particulates and contaminants on the sensors and/or heads, and in the feed path. These repetitive insertions of transaction cards into the reader often deposit grime, dirt and/or dust onto the internal pathways and contacts which may lead to a breakdown of the card reader's ability to reliably conduct a transaction. For example, as the contaminants accumulate, the ability of the card reader to read or write information from or to the data-carrying card may be greatly reduced or totally inhibited. Moreover, the simple random movement of air-born particulates from the environment (e.g., outdoors, hallways, smoke-filled rooms, etc.) into the open slot of the card reader may also contribute to depositing dust or particulates into the mechanisms of the transactional card reader which also contributes to unacceptable operation of the transactional card reader. The random air movement may also be exacerbated by any cooling type fan that might exist in the application platform.

For example, in a slot machine (or any other type of fan cooled platform) equipped with a card reader, from the moment the slot machine is powered up, a powerful cooling fan pulls a strong vacuum throughout the top of the slot machine and blows hot air out the top or side vents. The cooling fan draws air from wherever it can, including the card reader card slot. The cooling type fan may actually draw air from the environment more forcefully through the transactional card reader encased within the application platform thereby increasing the rate and perhaps density of dirt and particulate build up. Over time "dust bunnies" render the card reader inoperative or impair operation. Typically, these "dust bunnies" tend to build up toward the back of a card reader in slot machines having cooling fans. Thus, in a casino, the cooling fan of the slot machine draws smoke, carpet dust, and/or other particulates almost continuously through the transitional card reader. This is in addition to any other dirt build up due to other sources (such as dirt on transactional cards, for example). If the area has high people traffic, any type of dirt from transient movement by people may also contribute to the problem.

Still referring to casinos as an example, on many occasions an inoperative card reader associated with a slot machine gives rise to what is known as a "Guest Dispute" (G.D.), a term for any situation in which a guest is unhappy. Among the first actions a guest attempts upon arrival is to insert a player card into a favorite slot machine. When the card does not work, the casino has an instantaneous G.D. on their hands. Even though a technician might arrive promptly, the guest is already unhappy and may even start arguments with casino employees. Guest satisfaction is of prime importance and avoiding non-functional equipment contributes to guest satisfaction and a favorable overall guest experience.

In order to operate efficiently and to reduce down time, the rollers or other feed mechanisms, sensors and/or heads of the card reader should be cleaned of the gathered grit, dust, particulates or grime. Cleaning card readers on a regular basis removes dirt, magnetic oxides, ink residue, dust and numerous other contaminants from various types of concealed heads, photo and optic sensors, feed path and other rollers, as might be associated with any transactional card reader instance.

One conventional method for avoiding breakdown or loss of use of the card readers involves periodically cleaning the heads, sensors, and/or rollers by using a cleaning card with the same or similar dimensions as the transactional data-carrying card. Typically, cleaning cards, as commonly known in the industry, are constructed as a laminate of a semi-rigid core of acrylic, polyvinyl chloride (PVC), polyethylene terephthalate (PET), or acrylonitrile butadiene styrene (ABS) plastic material, or the like.

FIG. 1A is a block diagram showing an embodiment of a card reader 105 reading a common transactional card 110 (e.g., credit card, or similar type of data bearing card). The transactional card 110 is shown as having a magnetic strip 115 that may have encoded data and/or may receive encoded data. The magnetic strip 115 is read by sensor 120. A skilled artisan would recognize that there are other types of encoded transactional cards and corresponding sensors such as optical, embedded chip, or the like. The transactional card 110, when inserted into the card reader 105, is typically guided by guides 122 (or feeds), which may include rollers, along much of the length of the card reader but restrained by stops 125 (also known as limiters, limiting posts, lugs or posts) to a certain distance such that the transactional card 110 cannot be inserted past the stops 125. Repetitive insertion of transactional cards 110 into the card reader 105 contributes to a build-up of dust and particulates 130 at or near the stops 125. Occasionally, this dust and particulates can become compressed and may prevent full insertion of the transactional card 110 into the card reader 105 which, in turn, may prevent proper reading of the data on the transactional card by sensor 120.

FIG. 1B is a top view of embodiment of a common cleaning card 150 in a card reader, for cleaning the card reader 105. The cleaning card 150, similar to the transactional card in size, is also limited to the maximum insertion distance imposed by stops 125. The stops 125 also aid in preventing a card from being lost in the card reader. Therefore, the cleaning card 150 also pushes dirt and particulates 130 to the maximum distance 135, as defined by the stops 125. Over time, this dirt and particulates accumulate around stops 125 and even at the ends of the card guides 122.

FIGS. 2A–2C are embodiments of common transactional cards that may be used in various types of transactional card readers. FIG. 2A illustrates a transactional card 110A with a magnetic strip 115 which may be encoded with data. FIG. 2B illustrates a transactional card 110B with an electronic chip 116 which may be encoded with data which may be read by an appropriate electronic sensor. FIG. 2C illustrates a transactional card 110C with optical encoding 118 which may be read by an appropriate optical sensor.

The cleaning cards may also include non-woven fibers of a soft substantially nonabrasive material chemically bonded to both of the side surfaces. Sometimes the cleaning cards have small baffles or waffles slightly protruding from the surface of the cleaning card to aid in capturing dirt. The cleaning cards may be made, for example, using non-laminated, porous materials, e.g., essentially homogeneous spun-bonded polyester material, or they may have an abrasive material on one side of the semi-rigid core and a second non-abrasive, absorptive material on the other side. They are generally used in conjunction with a cleaning solvent. The cleaning cards may be pre-saturated with a cleaning solvent or the solvent may be added just prior to use of the cleaning card.

However, dust and other particulates can collect in the card readers such that cleaning with typical cleaning cards is not sufficient to avoid card reader breakdown due to dust and particulate accumulation. In addition to build up of "dust bunnies" from air flow, the cleaning cards and transactional cards may push particulates to the limit of the cleaning card's length, where the particulates aggregate or compress into a clump and can still interfere with the normal functioning of the card reader. Moreover, the various types of card readers typically have one or more limiter posts, or other blocking mechanism, at the far end opposite the card insertion opening, to stop an inserted card at a maximum insertion distance. In other words, the transactional and cleaning cards cannot be inserted any further into the card reader because of. the one or more limiter posts that prevent the card from moving beyond a certain point. Dirt can clump and possibly compress near these posts and prevent transactional cards from being fully inserted into the card reader and/or inhibit sensor operations if the dirt happens to collect near a sensor.

When a transactional card reader becomes impaired due to particulates or dirt which cannot be removed by traditional card cleaning mechanisms, the card readers are commonly dismantled and serviced to thoroughly clean the slots, sensors, and internal pathways, etc. Frequently this may also involve removing the transactional card reader from a platform such as, for example, a slot machine, ATM machine, a door, or a similar device and disassembled to thoroughly clean particulates from the internal working areas and sensing components of the card reader. This disassembly can be a relatively expensive and frequent operation, especially if, within the platform, there are multiple numbers of transactional card readers.

Moreover, transactional card reader down-time, and hence the application platform down-time, typically has direct negative effects on income producing activities such as casinos, as an example, where a slot machine might be removed from service for an extended period of time. Likewise, in a hotel example, where hotels are sensitive to security issues for their guests, a malfunctioning card controlled room lock may require that a room be taken out of service for a period of time which may also negatively affect income producing capabilities.

SUMMARY OF THE INVENTION

In an aspect of the invention, an apparatus is provided referred to as a card reader cleaning plow. The card reader cleaning plow cleans out contaminants accumulated in a card reader and pushes dust or dirt out the back of the card reader. The card reader cleaning plow may comprise a semi-rigid material having the same or similar width and thickness of the card that is normally read by the card reader, but being longer and having a notch, or notches, constructed into one or more edges of the cleaning card that allows the insertion of the card reader cleaning plow beyond any limiter post, or posts built into the card reader. The card reader cleaning plow may be inserted into the card reader and cleans the reader heads, any rollers or guides and the feed path, and harmlessly pushes the dust and particulates build-up through the card reader.

In another aspect of the invention an apparatus for cleaning pathways and electronic components in a card reader is provided. The apparatus comprises a flat, semi-rigid material having a width and thickness substantially the same as a transaction card normally readable by the card reader, but having a length greater than that of the transaction card normally read by a card reader. The semi-rigid material has at least one notch in the leading edge to permit a portion of the semi-rigid material to be inserted past one or more limiter posts in the card reader in order to clean one or more surfaces in the card reader.

In another aspect of the invention, a method of creating a card reader cleaning plow is provided. The method comprises constructing one or more notches at one end of a semi-rigid material for cleaning a card reader, the one or more notches adapted to engage at least one stop within the card reader and of sufficient length to permit a leading edge of the semi-rigid material when inserted into the card reader to travel past the at least one stop.

In another aspect of the invention, a method to clean a device for reading data bearing cards is provided. The method comprises inserting a card reader cleaning plow having at least one notch in a leading edge into a card reader and pushing the card reader cleaning plow into the card reader so that the leading edge of the card reader cleaning plow travels past one or more stops within the card reader, the one or more stops engaging the at least one notch to halt motion of the card reader cleaning plow, wherein the pushing pushes particulates past the at least one notch thereby cleaning the card reader.

In another aspect of the invention, an apparatus for maintaining card readers is provided. The apparatus comprises a means for cleaning a card reader that pushes particulates accumulated within the card reader substantially past one or more stops in the card reader.

DETAILED DESCRIPTION OF EMBODIMENTS OF THE INVENTION

In embodiments, the invention relates generally to an apparatus and method for cleaning card readers of various types. The embodiments of the invention clean various components of a transactional or operational card reader (referred to collectively as "card reader") including magnetic sensors, chip sensors, read or write heads, photo and optic sensors, and the feed path and feed devices such as rollers that may be associated with the card reader. The card reader herein refers to the type that requires a transaction card to be inserted into the card reader as opposed to a swipe-type card reader.

More specifically, the cleaning card apparatus and related methods of the invention provide for insertion of the cleaning card of the invention beyond any limiter posts in a card reader and thereby completely push particulates and dirt out of the card reader path. In this manner, build up of particulates and dirt in the pathways, in front of stops, or near a sensor might be avoided, or at least greatly reduced.

Figure 1A:
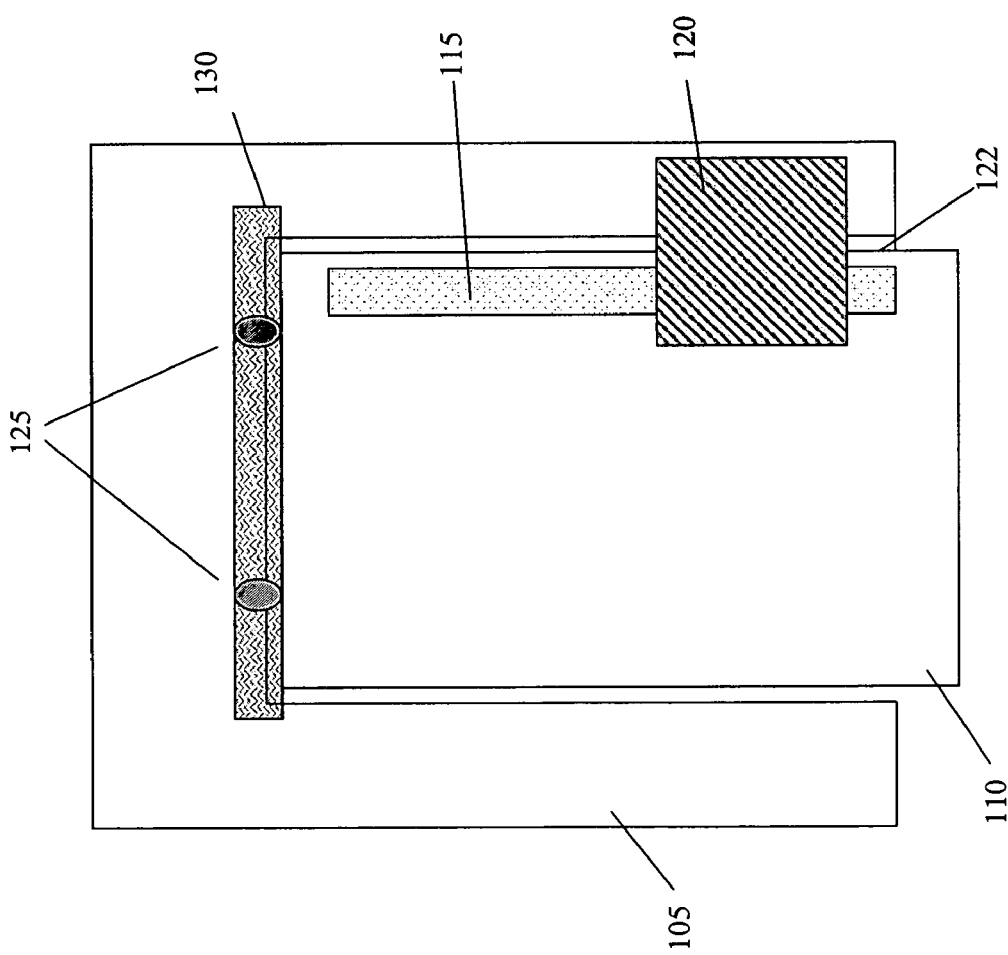
FIG. 1A is a block diagram of prior art showing an embodiment of a card reader reading a common transactional card.
Figure 1B:
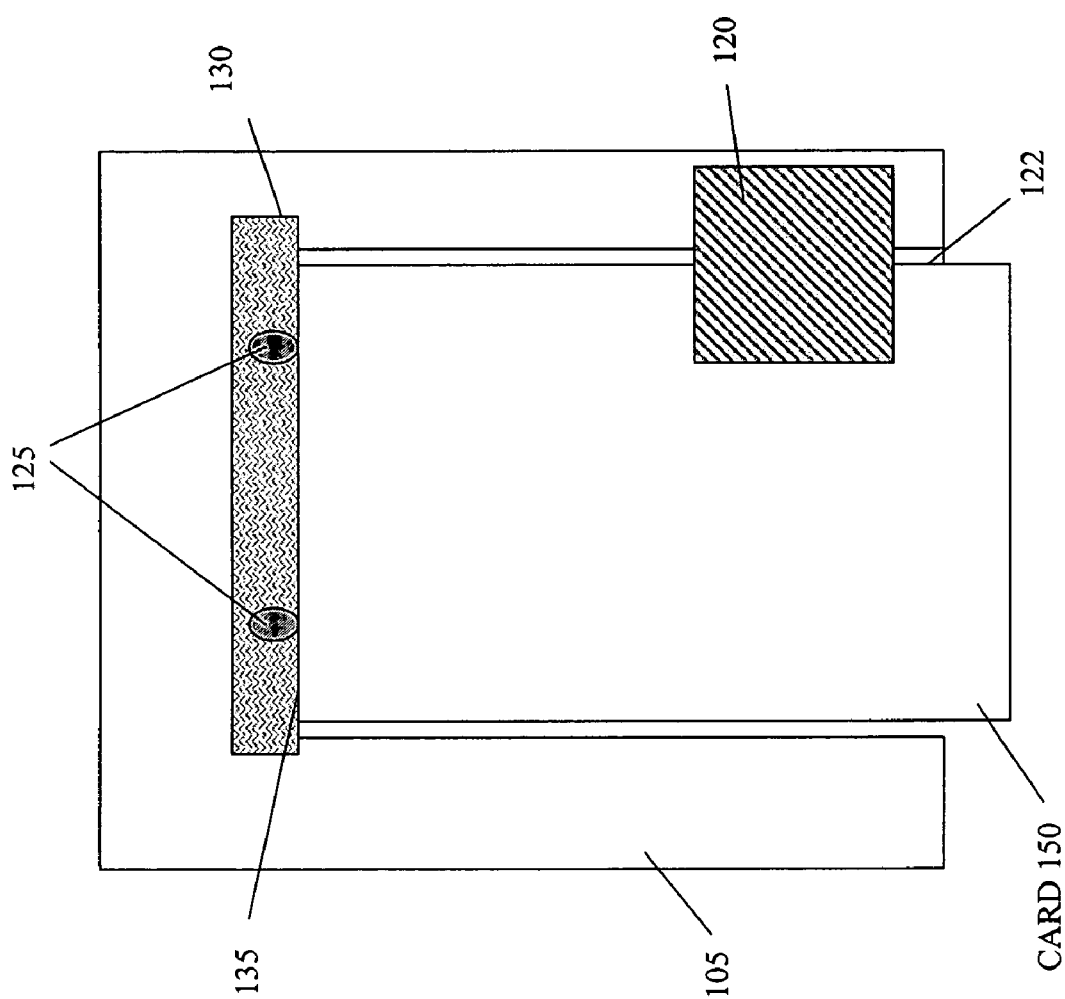
FIG. 1B is a top view of embodiment of a common cleaning card in a card reader.
Figure 2C:
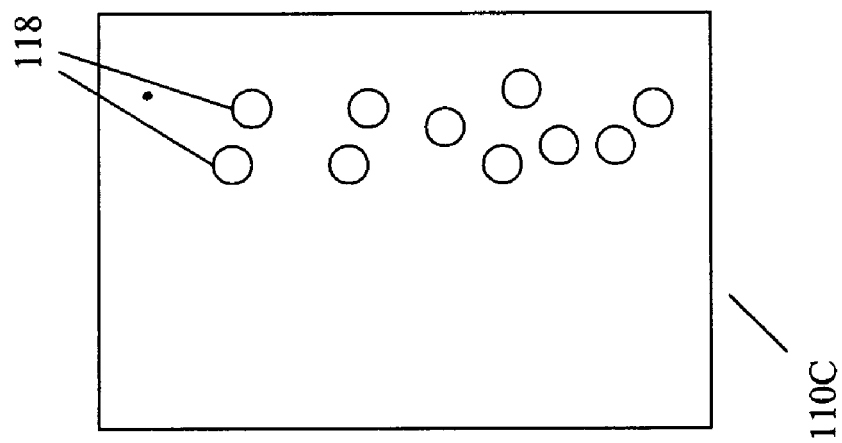
FIGS. 2A–2C are embodiments of common transactional cards that may be used in a various types of transactional card readers.
Figure 2B:
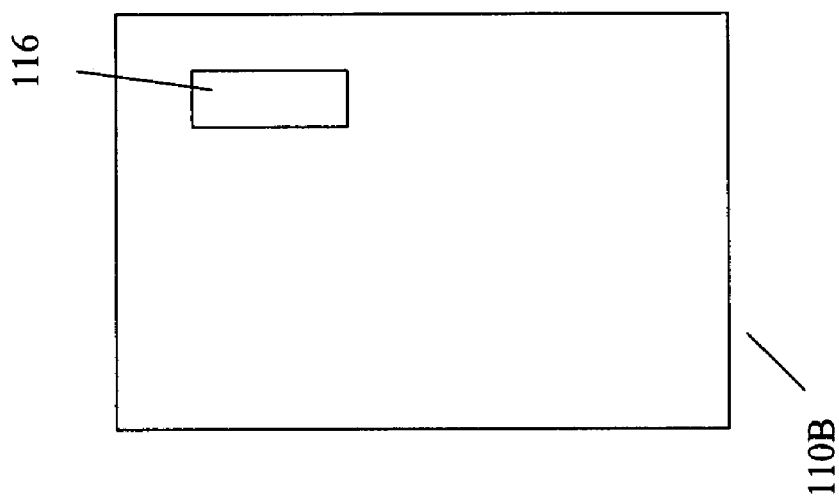
Figure 2A:
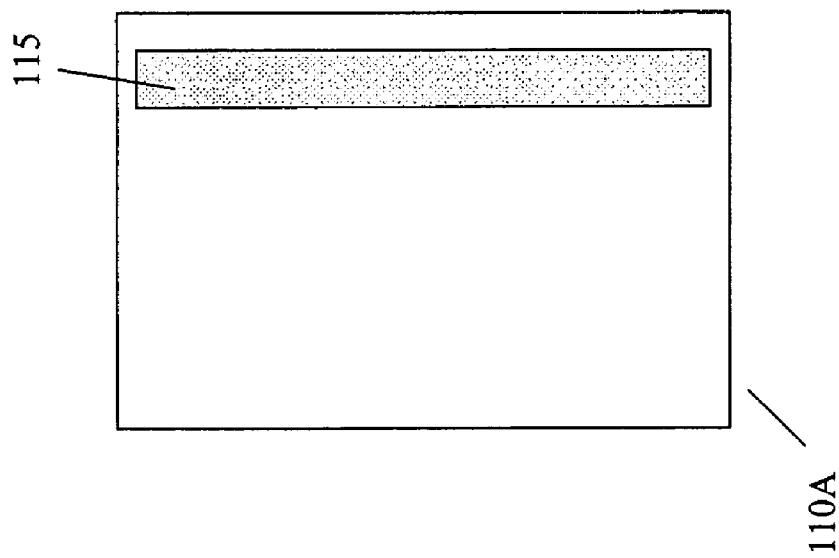
Figure 3:
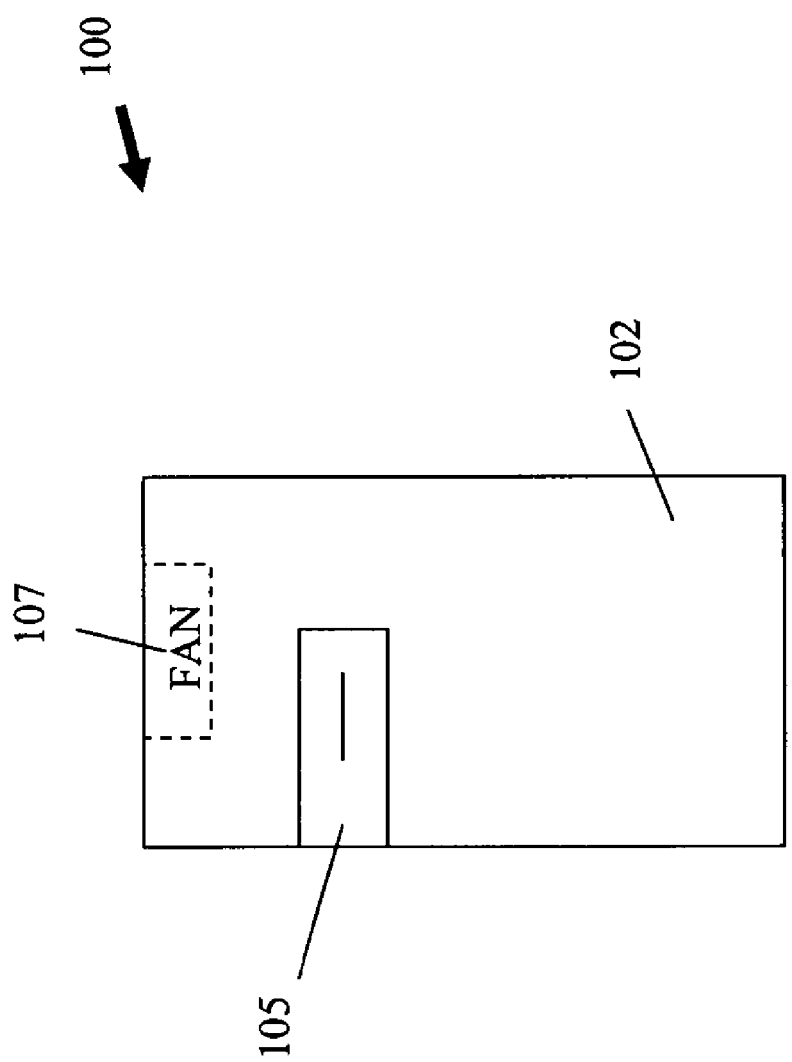
FIG. 3 is a block diagram showing an exemplary environment of the invention.

FIG. 3 is a block diagram showing an exemplary environment of the invention, generally denoted by reference numeral 100. The environment 100 may include an application platform 102 which may be, for example, an ATM machine, a door, a slot machine, a credit card controlled machine, or any platform having a card reader 105 with a slot for inserting a transactional card or cleaning type card. In certain application platforms, an optional fan 107 may be present to aid in cooling the application platform 102.

Figure 4:
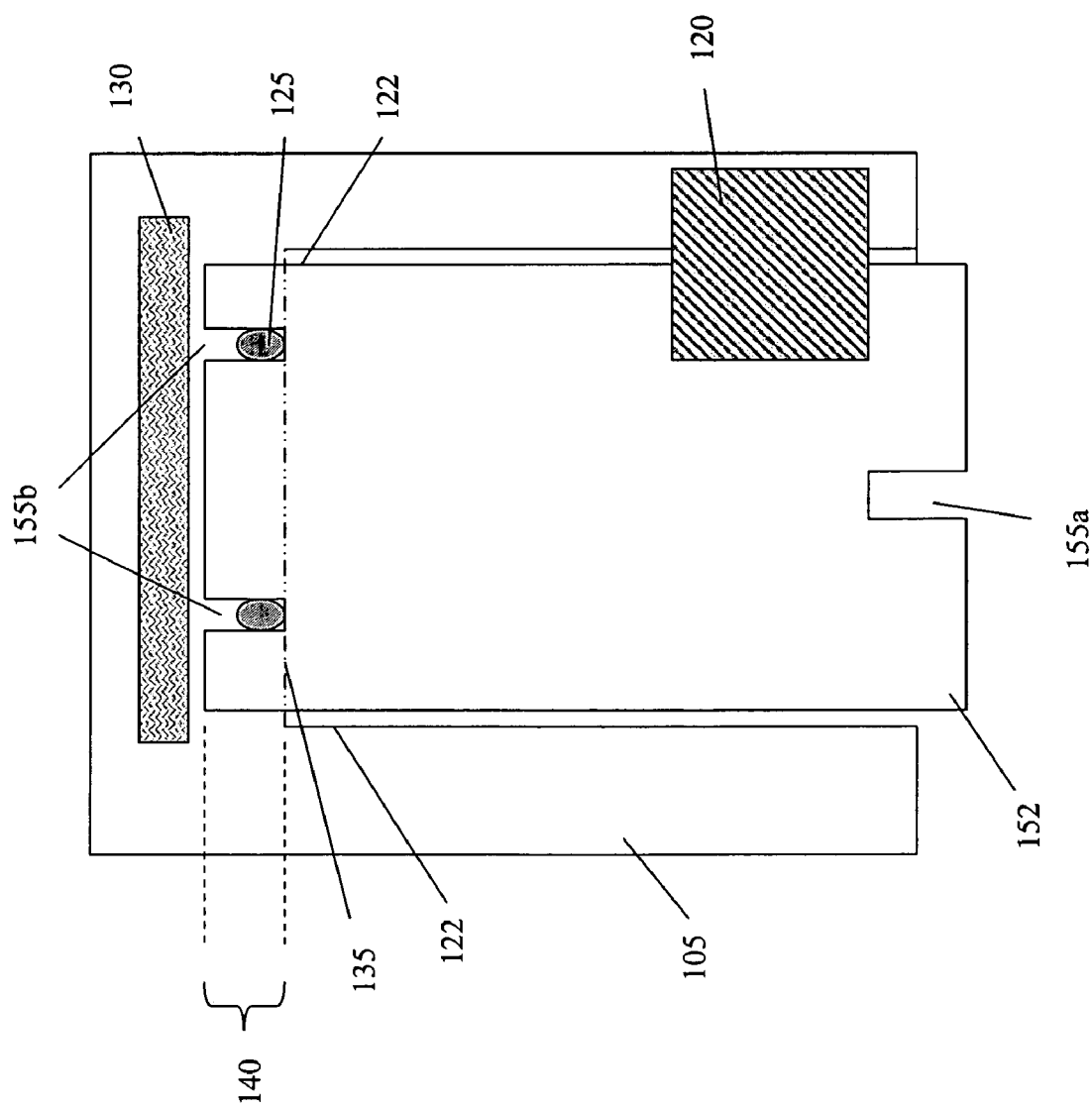
FIG. 4 is a top view of an embodiment of the invention in a card reader.

FIG. 4 is a top view of an embodiment of the invention in a card reader. Cleaning card 152 is shown inserted in to a card reader 105. The cleaning card 152 of the invention is also known as a "card reader cleaning plow." This particular card reader 105 is shown as having an associated magnetic pick-up 120 (or sensor), but may have any type of sensor depending on the type of card reader. The card reader cleaning plow 152 is typically longer than a corresponding transaction card and is shown in this example with one or more notches 155 on two ends. The notches 155 are constructed to permit the card reader cleaning plow to be inserted past the stops 125. More specifically, the stops 125 receive the notches 155, thereby allowing the end of the card reader cleaning plow 152 to reach a position beyond stops 125. The notches may be of different length and/or width, as shown by notches 155a and 155b, and discussed more fully below. A technician may choose an appropriate end of the card reader cleaning plow to insert (e.g., if one notch is needed, then the one-notch end is used) according to the type of card reader to be cleaned. Some card readers have one stop, others have two or more stops. Any number of notches may be constructed at either or both ends of the card reader cleaning plow of the invention, as necessary, according to the type of card reader to be cleaned. In embodiments, the corners of the card reader cleaning plow may be rounded and the internal corners of the notches may also be rounded (perhaps substantially matching a corresponding stop's curvature).

When the card reader cleaning plow 152 travels past the stops 125, dirt and particulates are moved beyond the stops 125 and also cleared from the guide 122, i.e., the track or path where a cleaning or transactional card slides. As shown in FIG. 4, the added distance 140 permits dust and particulates 130 to be pushed well beyond the previous stop point 135 when no notches were employed in a cleaning card. The dirt and particulates 130 may then be moved to a position beyond the stops 125 and drop harmlessly of out the end of the card reader 105, depending on the type of card reader.

Figure 5:
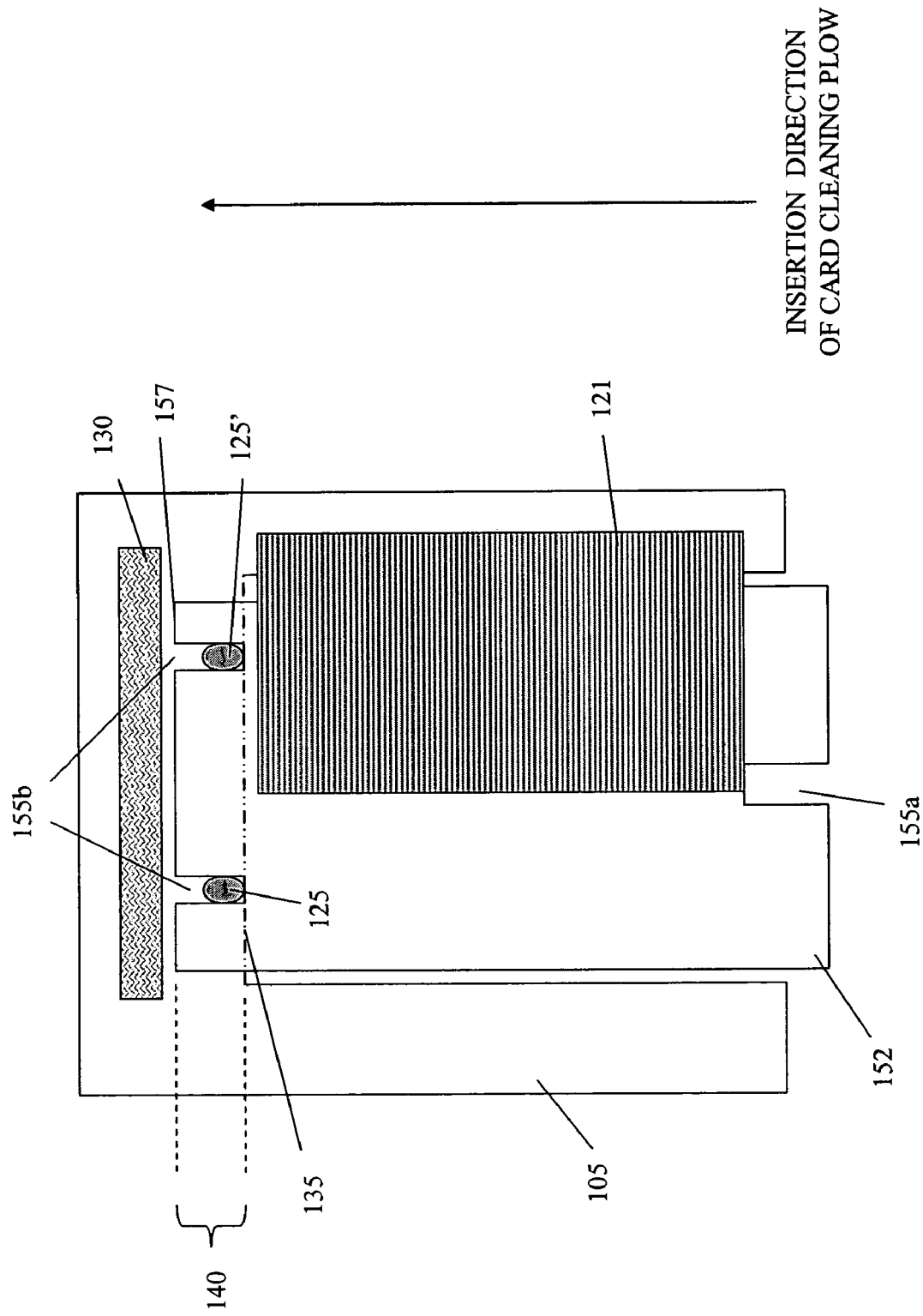
FIG. 5 is a top view of an embodiment showing the use of a card reader cleaning plow of the invention in an optical sensor equipped card reader.

FIG. 5 is a top view of an embodiment showing the use of a card reader cleaning plow of the invention with an optical sensor equipped card reader. In this embodiment, the card reader cleaning plow 152, when inserted and pushed fully through the card reader until the notch or notches 155 engage the one or more stops 125, the front edge 157 pushes any dirt or particulates well beyond the end of optical sensor 121 and past the stop(s) 125. When a sensor 121 is near a stop, such as 125', as illustrated in FIG. 5, build up of dirt may occur so that the sensor 121 ceases functioning reliably, particularly if the dirt builds up along the sensor 121 near or in front of the stop 125'. In this case, the sensor may be intermittent, even when a transaction card is inserted fully. The card reader cleaning plow of the invention therefore may clean the face of the sensor 121 and push any dirt past the stops 125. This permits a transaction card to be fully inserted into the card reader up to the stops 125 so that information on the transaction card can be reliably read.

Certain types of card readers employ one stop while others employ two or more stops. The card reader cleaning plow may be constructed with multiple configurations so that one end may be used for one type of card reader and the other end another type of card reader. This is illustrated in FIGS. 4 and 5 where one end has one notch 155a and the other end of the card reader cleaning plow has two notches 155b. Of course, any combination of notches may be constructed, as appropriate. Further, the length of a notch may be constructed according to the type of card reader. Since, some types of card readers have components located beyond the stops, care must be taken to prevent inadvertent damage to the components. Therefore, the length of the notch employed in the card reader cleaning plow may be limited to assure that the card plow does not encroach upon any components beyond the stops, hence the need for a plurality of notch lengths in embodiments.

Figure 6A:
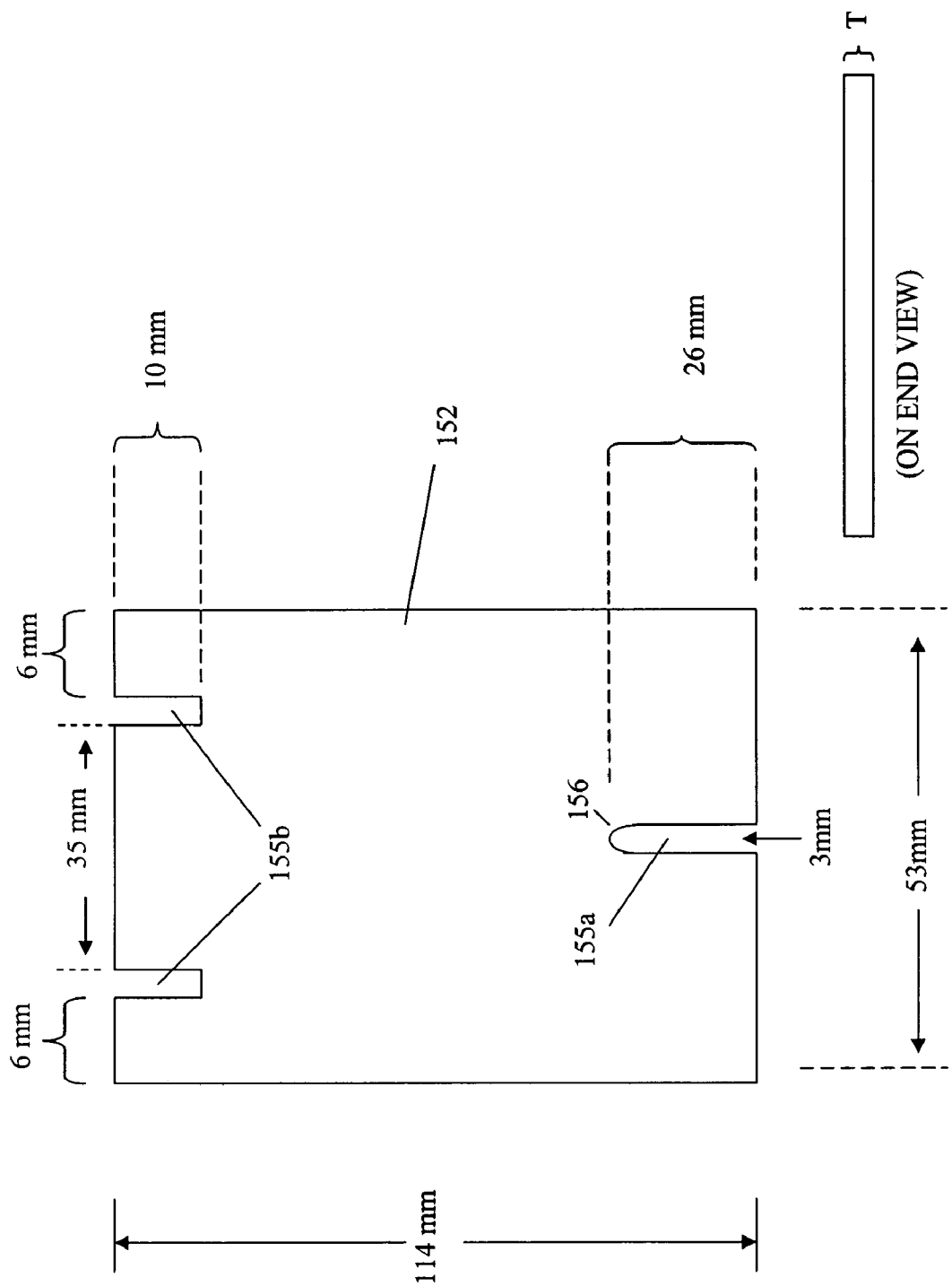
FIGS. 6A and 6B are embodiments of a card reader cleaning plow, according to the invention.
Figure 6B:
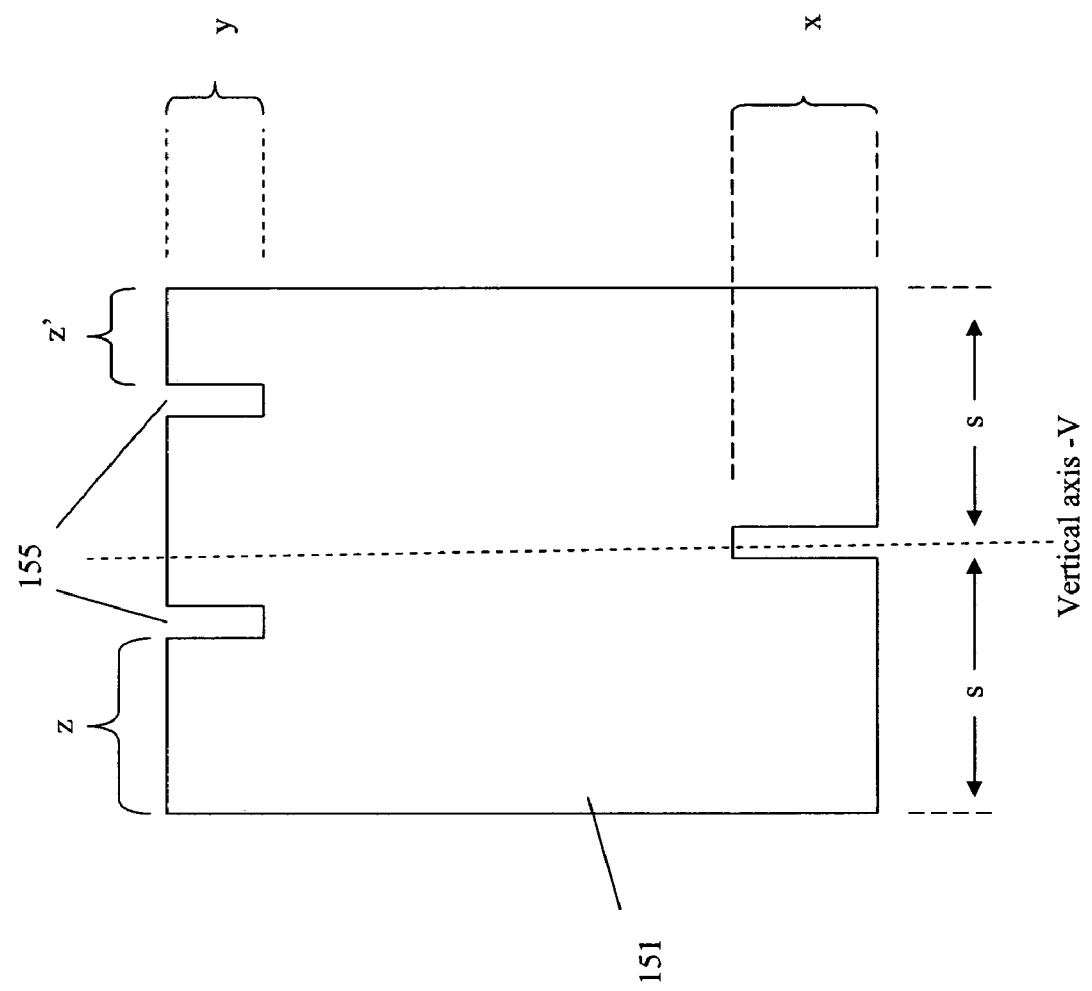

FIGS. 6A and 6B are embodiments of a card reader cleaning plow, according to the invention. FIG. 6A shows exemplary configurations and approximate dimensions of a card reader cleaning plow 152, however any assortment of dimensions may be possible depending on the type of the card reader to be cleaned or the manufacturer of the card reader. In this embodiment, the card reader cleaning plow may have an overall width of about 53 mm and a length of about 114 mm. At one end, a notch may be approximately 26 mm in length and about 3 mm in width. At the opposite end, two notches may have a width of about 3 mm and are shown equally spaced from the ends (e.g., about 6 mm, but may vary) of the card reader cleaning plow. In embodiments, the width may range from about 2 mm to about 7 mm, but may be more or less, as necessary, for a given type of card reader. The length of the opposite notches may be about 10 mm. The card reader cleaning plow 152 may be made from any appropriate cleaning material, at least in part, with or without varying surface effects such as waffles, for entrapping dirt. The card reader cleaning plow 152 typically has a thickness "T" substantially the same as the corresponding transactional card or traditional cleaning card. A technician or other person would select which end of the card reader cleaning plow 152 to use typically according to the type of card reader being cleaned.

In embodiments, any notch (e.g., 155a and/or 155b) may have a radius 156 in order to more closely match a curvature of a corresponding stop's engaged surface, depending on the card reader. In this way, the radius 156 permits the cleaning effects of the card reader cleaning plow notches, such as notch 155a, to engage more closely around the corresponding stops when the notches have a curved face thereby cleaning the stop(s) more thoroughly and aiding in pushing dirt and particulates around and past the stop(s). The curvature may be of any radius, as necessary, depending on card reader types.

FIG. 6B is an embodiment of a card plow, according to the invention. The dimensions of the card reader cleaning plow may be constructed to engage any commonly available card reader, as necessary. The size of the card reader cleaning plow is substantially the same size of a transactional card used with any particular type of card reader (the size of the card reader cleaning plows are typically related to the type of card reader and its associated transactional cards), but may have added length for ease of use during maintenance operations. Typically, at least one notch of length "x" is constructed at one end of the card plow so that the forward edge of card reader cleaning plow proceeds past a stop when inserted. The notch is also of suitable width to permit the card plow to engage past any corresponding stop, but the tolerance in the width is still sufficiently close to the width of the stop in order to clean the sides or surfaces of the stop as the front edge of the card reader cleaning plow and the length of the notch passes the stop.

The card reader cleaning plow is stopped when the stop or stops engage a notch or notches at the back edge of the notch(s), thereby preventing the card reader cleaning plow from being inserted further. The width of a notch may also be substantially the same size of the stop which may expand slightly as the notch engages and passes along the stop. The inner walls of the notch may comprise cleaning material which may clean the stop's surface as it passes.

FIG. 6B also shows that the length "x", the length of a notch on a first end, is longer than length "y", the length of one or more notches on a second end of the card reader cleaning plow 151. In embodiments, it is possible that "x" may be less than "y". Further, the notches on the second end are shown in this embodiment to be non-symmetrical about the vertical V-axis. In embodiments, the spacing of the two notches may of course be symmetrical about the v-axis. The distance of the notches on the second end, as measured from a respective nearest side, may of course be equal or non-equal (e.g., distance z and z', shown as unequal). Further, more than two notches may be employed on any end, as necessary, depending on the type of card reader. In embodiments, the range of lengths for "x" may be about ¼" to about 1¾" and the range for "y" may be about ¼" to about 1½". In embodiments, the width of notches may range from about ¹⁄₁₆" to about ½".

In one exemplary embodiment, the card reader cleaning plow may have a length at least about 96 mm and a width of at least about 53 mm. The thickness may be about 0.76 mm, but may vary depending on a particular card reader type. In other embodiments, the card reader cleaning plow length may be longer than about 111 mm and the width about 53 mm, but the width may vary according to the associated card reader type.

Figure 7A:
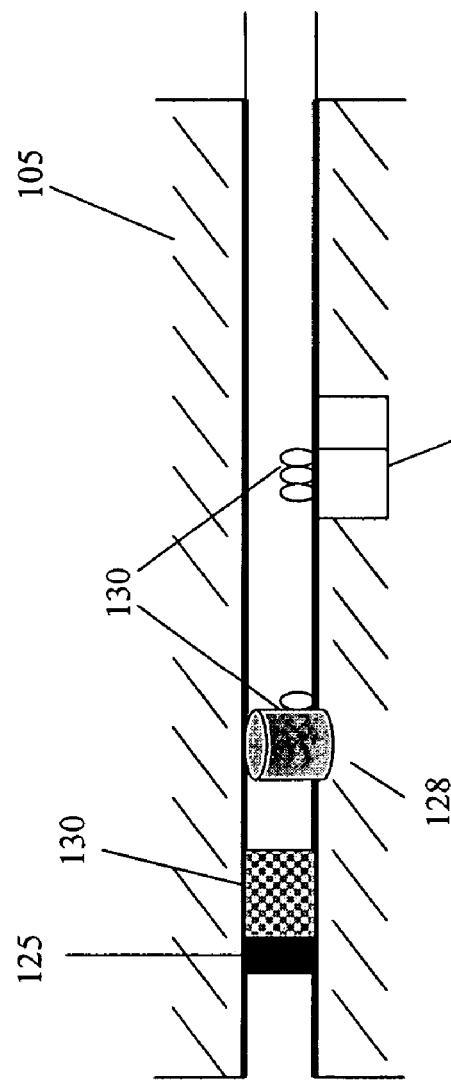
FIG. 7A is an illustration of a side view of a card reader with common dirt accumulation problems.

FIG. 7A is an illustration of a side view of a card reader with common dirt accumulation problems. This illustration shows dirt accumulation 130 (e.g., dust bunnies) on the sensor 120, and also at the ends of the card reader 105 near the stops 125, perhaps compacted by repeated insertions of transaction cards.

Figure 7B:
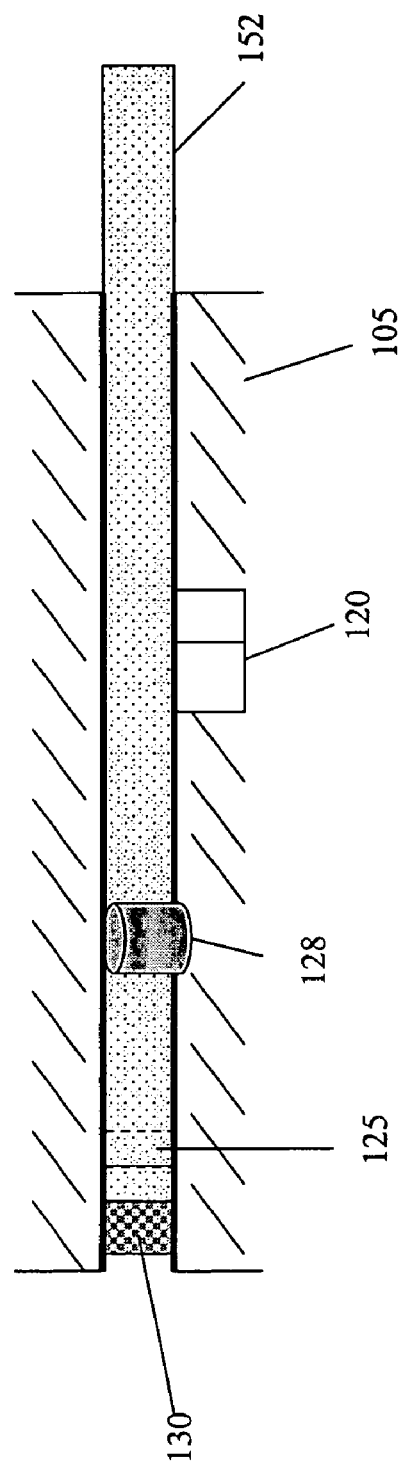
FIG. 7B is an embodiment of a side view of a card reader cleaning plow in a card reader showing the effects of the card reader cleaning plow, according to the invention.

FIG. 7B is an embodiment of a side view of a card plow in a card reader showing the effects of the card reader cleaning plow, according to the invention. A card reader cleaning plow 152 may be inserted into a card reader 105 so that dirt and particulates (e.g., dust bunnies 130 of FIG. 7A) are pushed substantially past stops 125 out of the back of the card reader 105 by the leading edge/face of the card reader cleaning plow 152. The sensor 120 (which might be a write head) and optional roller 128 for guiding an inserted card also has dirt removed from the sensor's (and/or roller's) surface by the sliding motion of the card reader cleaning plow 152. The track or guides of the card reader also are cleaned with the dirt being pushed also out the back of the card reader 105.

In another embodiment of the invention, the cleaning card is constructed of any of a number of suitable materials commonly used in existing cleaning cards that allow the card to be wetted with any of a number of commonly used cleaning solvents. The cleaning card may be as long as about 5" and as wide as about 2⅛", and the thickness of a transactional card normally used with the card reader, according to its function, with a set of notches in one end and a notch at the other end. One notch is constructed in the middle of one edge of the cleaning card and is about ¹⁵⁄₁₆" to about 1" in length and about ⅛" wide. Two other notches may be constructed on the opposite edge. The two notches are located about 3/16" from the outer edges of the card reader cleaning plow; they are about ⅝" in length and about ⅛" wide. These two sets of notches (one set on either end of the card reader cleaning plow) allow the cleaning card to be used in either of the two most commonly used card reader devices. Other notches may be configured as necessary when manufacturers of card readers use additional limiter post configurations. The card reader cleaning plow width dimensions are generally sized to conform to corresponding dimensions of a transactional card which carries the data and may be colored to increase its opacity and thus its ability to be accepted into some equipment.

In embodiments, the material of a card reader cleaning plow may be a laced nonwoven fabric such as DuPont's Sontara RTM which is soft, substantially nonabrasive, lightweight, and durable. This semi-rigid material is substantially penetrable to improve absorption of the cleaning solvent, e.g., 70%–98% isopropanol.

The card reader cleaning plow may be created by constructing one or more notches at one end of a semi-rigid material for cleaning card readers. The one or more notches are adapted to engage at least one stop within the card reader and of a length to permit a leading edge of the semi-rigid material, when inserted into the card reader, to travel past the at least one stop.

The apparatus and method of the invention has significant advantages when used to maintain card readers. These advantages include at least substantially improved overall operational performance and functional longevity while minimizing down-time. As a result, any associated application platform employing a card reader remains active and in-service for longer periods of time before maintenance or servicing might be required. Moreover, better removal of particulates increases reliability of the card reader overall and avoids or delays costly tear-down maintenance of any associated platform or machinery such as slot-machines, locks, ATM machines, security control, or similar applications. In fact, in certain applications, maintenance cycles may now be tied to other issues/factors, rather than the performance of the card reader, since an improvement in card reader reliability typically occurs with the use of the invention.

The card reader cleaning plow of the invention may be inserted past the limiter posts of a transactional card reader to physically remove any particulates completely from the feed path. The cleaning card apparatus may be made of any of a number of materials commonly used in existing cleaning cards that allow the card to be wetted (or pre-wetted) with any of a number of commonly used cleaning solvents. The card reader cleaning plow may be of extra overall length as compared to a transaction card so that a technician may comfortably control the card reader cleaning plow when inserting and removing the card reader cleaning plow from a card reader during maintenance.

While the invention has been described in terms of embodiments, those skilled in the art will recognize that the invention can be practiced with modifications and in the spirit and scope of the appended claims.

What is claimed is:

1. An apparatus for cleaning a card reader, comprising a cleaning card of semi-rigid material having a width substantially the same as a data bearing transactional card readable by the card reader with at least one notch in at least one end of the cleaning card, the at least one notch having a length and a width so that when the cleaning card is inserted into the card reader the at least one notch engages a corresponding stop and the at least one notch slides past the stop, the cleaning card pushing particulates substantially past the stop.

2. The apparatus of claim 1, wherein the cleaning card has a length greater than a data bearing transactional card readable by the card reader.

3. The apparatus of claim 1, wherein the semi-rigid material is any woven or non-woven material for cleaning.

4. The apparatus of claim 1, wherein the semi-rigid material is substantially homogeneous spun-bonded polyester material.

5. The apparatus of claim 1, wherein the at least one notch is located at the center of one edge of the cleaning card and having a length in the range of ¼" to 1¾" and a width ranging from about 1/16" to ½" to allow the cleaning card to move beyond a limiter post in the card reader.

6. The apparatus of claim 1, wherein the at least one notch is a plurality of notches oriented perpendicular to the leading edge of the card, the plurality of notches ranging from approximately ¼" to 1½" long and approximately ⅛" wide to allow the cleaning card to move beyond two limiter posts in the card reader.

7. The apparatus of claim 1, wherein the at least one end includes a leading edge.

8. An apparatus for cleaning pathways and electronic components in a card reader, the apparatus comprising a flat, semi-rigid material having a width and thickness substantially the same as a transaction card normally readable by the card reader, but having a length greater than that of the transaction card normally read by the card reader, the semi-rigid material having at least one notch in the leading edge to permit a portion of the semi-rigid material to be inserted past one or more limiter posts in the card reader in order to clean one or more surfaces in the card reader.

9. The apparatus of claim 8, wherein the semi-rigid material is wetted with a cleaning solvent.

10. The apparatus of claim 8, wherein the semi-rigid material is any woven or non-woven material.

11. The apparatus of claim 8, wherein the semi-rigid material is substantially homogeneous spun-bonded polyester material.

12. The apparatus of claim 8, wherein the at least one notch is in the center of the leading edge of the semi-rigid material and has a length in the range o ¼" to 1¾" and a width in the range 1/16" to ½" to allow the apparatus to move beyond the one or more limiter post in the card reader.

13. The apparatus of claim 8, wherein the at least one notch is a plurality of notches in the leading edge of the semi-rigid material and each of the plurality of notches is approximately ¼" to 1½" long and approximately 1/16" to ½" wide to allow the semi-rigid material to move beyond the one or more limiter posts in the card reader to move particulates substantially past the one or more limiter posts.

14. The apparatus of claim 8, wherein the one or more surfaces includes a surface of at least any one of a roller, a pathway, a sensor, a component, a write-head, a pick-up and a stop.

15. The apparatus of claim 8, wherein the length of the semi-rigid material is 5", or less.

16. The apparatus of claim 8, wherein the width of the apparatus is about 53 mm and the length is about 114 mm.

17. The apparatus of claim 8, wherein the semi-rigid material has a plurality of notches on the non-leading edge of the semi-rigid material.

* * * * *